Feb. 9, 1937.  R. W. CHAPMAN  2,070,040
MACHINE FOR MAKING PULP ARTICLES
Original Filed Nov. 13, 1930  10 Sheets-Sheet 5

INVENTOR
Ralph W. Chapman
by Wright, Brown, Quinby & May
att'ys

Feb. 9, 1937.                R. W. CHAPMAN                2,070,040
                   MACHINE FOR MAKING PULP ARTICLES
                  Original Filed Nov. 13, 1930    10 Sheets-Sheet 6

INVENTOR
Ralph W. Chapman
by Wright, Brown, Quinby & Gray
Att'ys

Feb. 9, 1937.    R. W. CHAPMAN    2,070,040
MACHINE FOR MAKING PULP ARTICLES
Original Filed Nov. 13, 1930    10 Sheets-Sheet 8

Fig. 20

INVENTOR
Ralph W. Chapman
by Wright, Brown, Quinby & May
attys

Patented Feb. 9, 1937

2,070,040

UNITED STATES PATENT OFFICE 2,070,040

MACHINE FOR MAKING PULP ARTICLES

Ralph W. Chapman, Old Town, Maine, assignor to The Old Town Company, Old Town, Maine, a corporation of Maine Application November 13, 1930, Serial No. 495,458
Renewed August 25, 1934

6 Claims. (Cl. 92—54)

My invention relates to machines for molding articles from plastic material, and particularly to those for making plates and other articles out of wood pulp containing so much water as to be freely fluid.

An object of my invention is to provide an improved machine and method for molding such articles, drying them, and discharging them in finished condition. A further object is to carry out the cycle of operations more rapidly, economically and efficiently than heretofore, with production of articles of superior quality. Still another object is to provide automatic means of control for the several steps in the process of production.

Basically, the machine for producing articles such as are hereinbefore noted, consists of a molder unit and a finishing unit, coordinating means for transferring the article from the molder unit to the finishing unit, and similar coordinating means for discharging the finished article, to the end that continuous production of finished articles may result.

For mass production it has been found advisable to combine a plurality of such machines to form a battery operated from a single source of power, and supplied from a single source of supply, the separate machines being correlated in action to conserve power and the uniform supply of material to each machine, means being provided for disconnecting any unit without interference with the mechanical operation of any other unit, or the functioning of any other machine in the battery. This permits the repairing or adjustment of any unit without cessation of production in any other constituent machine of the battery.

Except in cases of slight repair or adjustment in a unit, it is usually preferable to disconnect both units of a machine, as the functioning of either unit is dependent on the coordinate action of the companion unit.

My invention consists in the novel combination of molding and finishing means which I employ; in the method by which I accomplish my objects; and in the novelty of the combination of elements and mechanism comprised in my machine. Other objects and novelties will appear in the accompanying specification and claims and the drawings forming a part thereof.

In the drawings—

Fig. 7—A is a fragment, shown partly in section and partly in elevation, of the pickoff die.

Fig. 8 is a sectional elevation through the molder unit on line 8—8 of Fig. 2.

Fig. 8—A is a fragmental plan of the die base.

Fig. 9 is a sectional fragment of the molding elements on the line 9—9 Fig. 1, enlarged.

Fig. 10 is an enlarged sectional plan on the line 10—10, Fig. 8.

Figure 1:
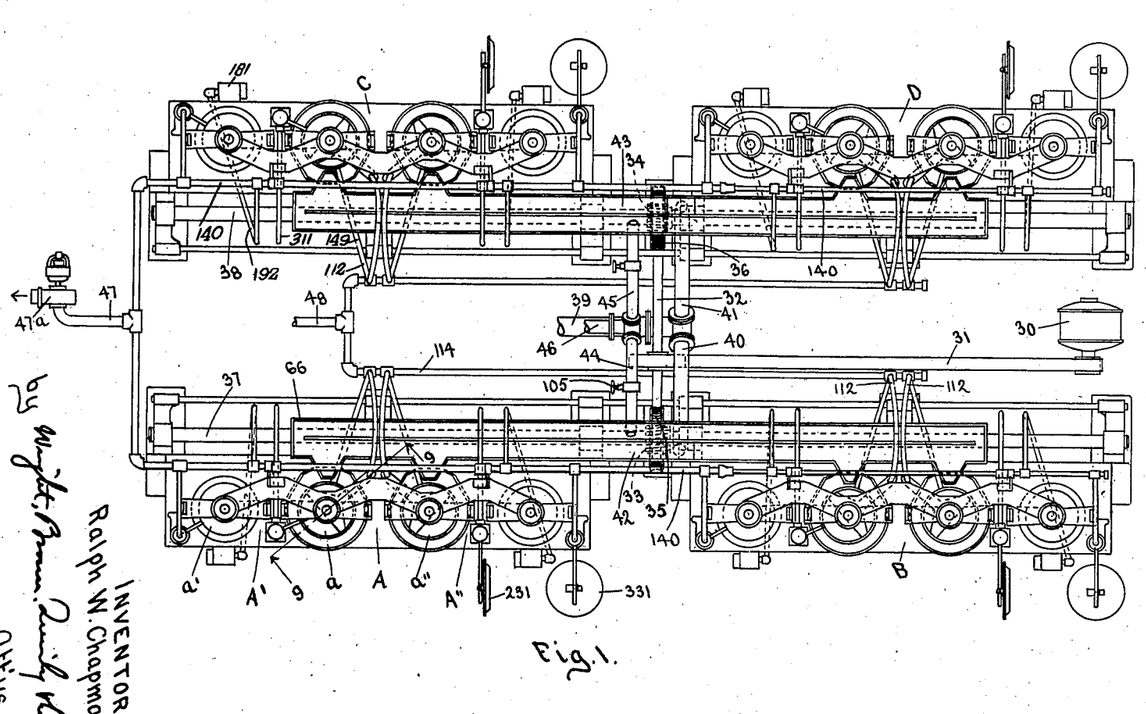
Fig. 1 is a somewhat diagrammatic plan of a battery of machines, much of the mechanism hereinafter described being omitted, to show primarily the relative arrangement of and connections to the elements of the battery.

Referring to the drawings, Fig. 1 shows a battery of machines, arranged in sections of two machines each, in two parallel rows, although a battery may comprise a plurality of machines or sections, arranged in any convenient form. I have indicated these sections as A, B, C, and D, the individual machines of one section as A' and A'' and the molder and finishing units of an individual machine respectively as $a$, and $a'$.

I prefer to arrange each section in such manner that the molder units of the machines composing each section are adjacent as at $a$, and $a''$. The finishing units are thus at the ends of each section, and the transfer of formed articles, is respectively to the right and left.

The battery may be operated from a single source of power, the plastic material as wood pulp, and the air and wash water each being supplied to the several machines from respective single sources of supply as will be explained. In the drawings I have shown the motor 30 as the source of power, driving by means of the belt 31 the shaft 32 on which are secured right and left worms 33, 34 meshing respectively with the worm gears 35, 36 secured respectively to the drive shafts 37, 38, by means of which the several machines are operated through suitable connections. The plastic material is supplied from a source of supply not shown, through the main 39 and the branches 40, 41, to the supply boxes 42, 43 serving the respective machines. Overflow pipes 44, 45 from the supply boxes conduct surplus plastic material through the return main 46 to the source of supply, permitting a continuous circulation, an essential requirement when wood pulp in liquid form is used, as the wood fibre of the mixture tends to precipitate unless the movement of the current is continuous. In similar manner air connections are made between each machine and the air main 47 connecting with an exhauster 47a (Figure 1); and wash water is supplied from a source of water supply through the water main 48. The connections and functions of each of the above described systems will hereinafter be described in connection with a single complete machine.

Referring to the several members of the battery, each machine is correlated with its companion in a section, and the sections with one another in such manner that variation in power expended, and in the velocity of flow in the several mains, will be minimized and an approximate constant maintained.

As the article produced by each machine of the battery depends on the form and size of the molds, it thus becomes possible to produce a variety of molded articles simultaneously, and to vary the relative number of such articles, by disconnecting the particular machine from action, without interfering with the production of the other machines of the battery. As the present machine has been designed to make plates from wood pulp, the product will be generally referred to hereinafter as plates, but without intention of limiting the invention to such articles.

The air conducting system is adapted first to induce a continuous flow of air for the purpose of extracting a portion of the liquid content of a freshly molded plate, and secondly, to create a partial vacuum in the transfer and picker arms, and in other parts of the machine, for the purpose of causing the adhesion of the plate to said arms while they are performing their functions, and for other useful purposes, as will hereinafter appear, the air conducting system including an air exhauster, not shown, preferably an exhaust fan or blower, and a ramified conduit including a plurality of conduit portions through which a flow of air may be induced by the blower, automatically actuated vacuum valves being associated with certain of said conduit portions to cause and break a partial vacuum therein.

The water main supplies water to each molder unit of the battery, automatic valves admitting water in each cycle of operation, to insure clean, foraminous surfaces for molding the succeeding article. I will now describe the construction and operation of a single machine, which is applicable to the other machines comprising a battery.

Figures 2, 3:
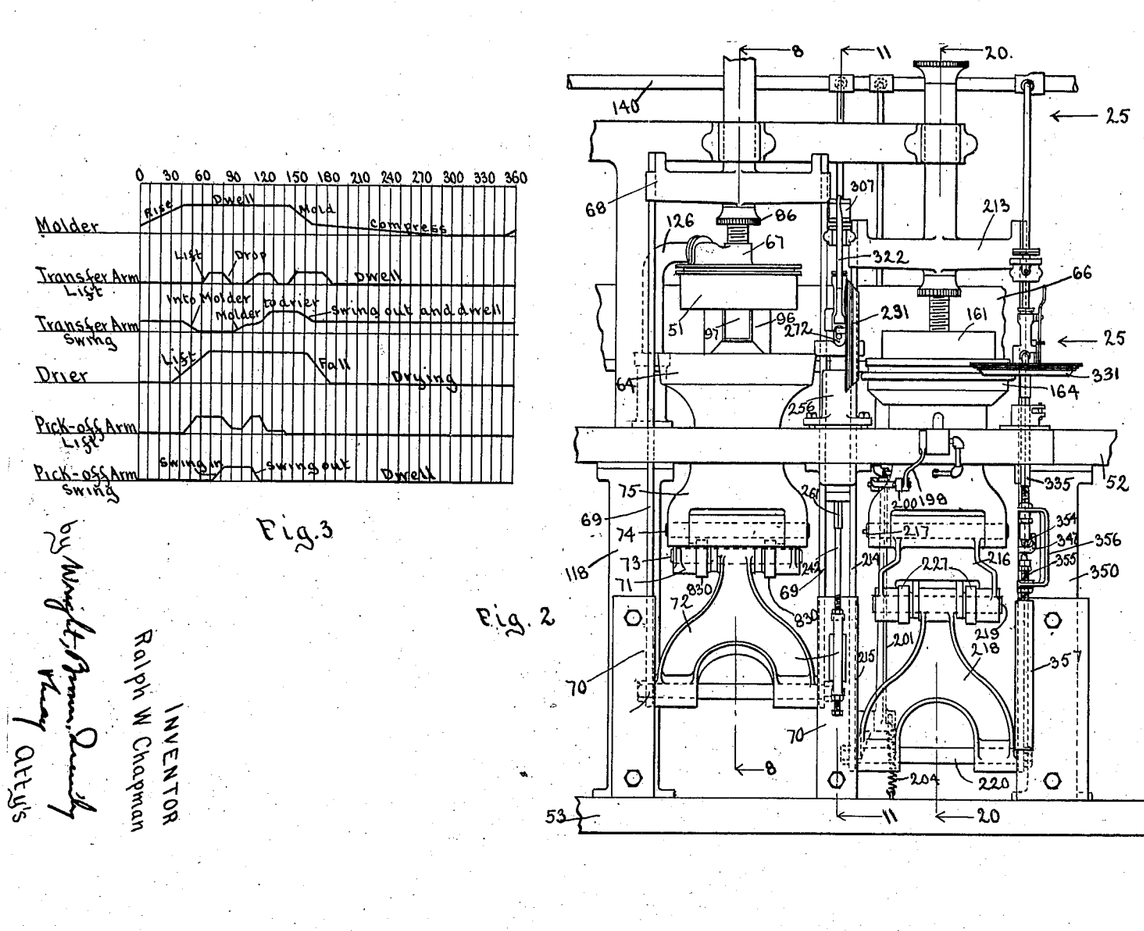
Fig. 2 is a front elevation showing the two units comprising a machine.
Fig. 3 is a diagram of the cycle of operations.
Figure 4:
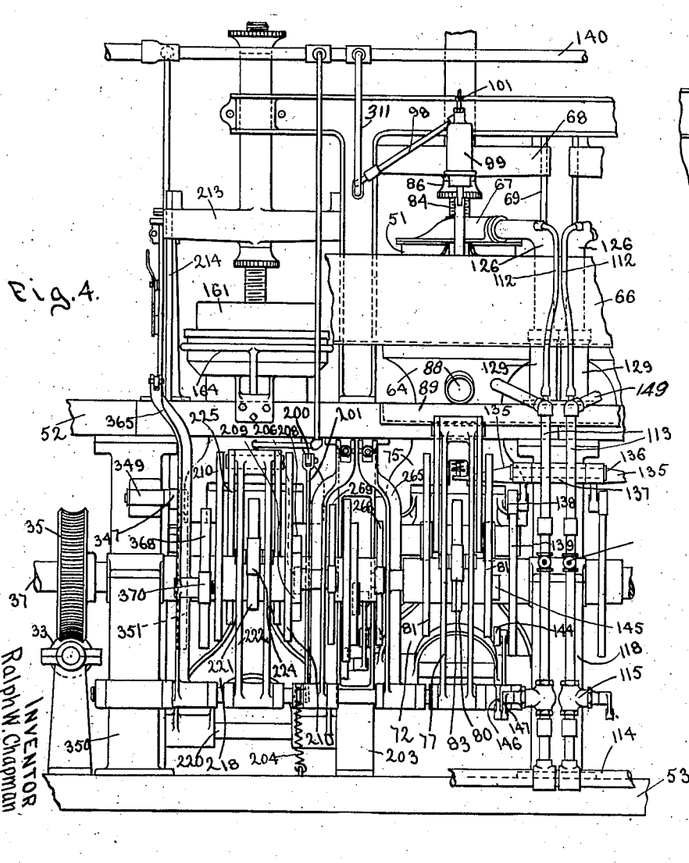
Fig. 4 is a rear elevation corresponding to Fig. 2.
Figures 8, 8A, 9, 10:
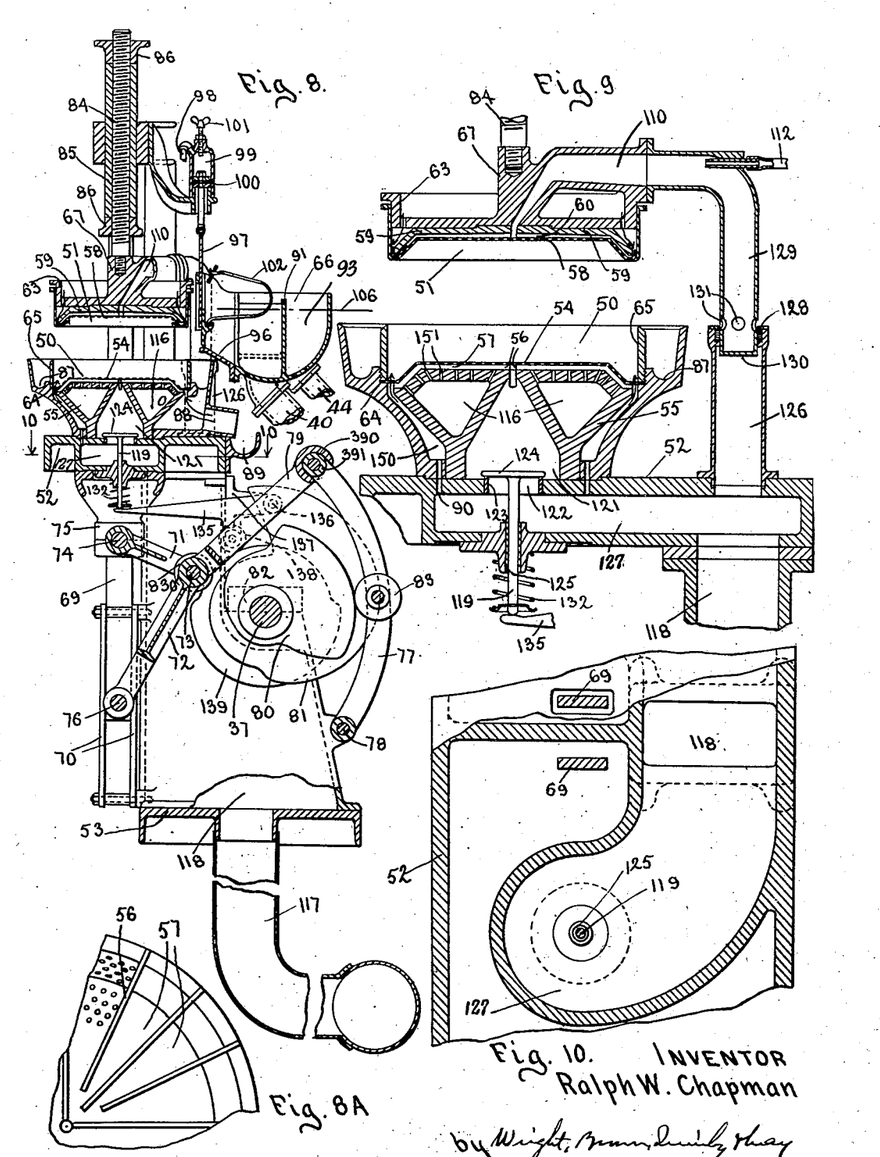

Referring to Figs. 1, 2, 4 and particularly to Figs. 8, 8—A, 9, 10, the molder unit of each machine includes a fixed die 50 and a movable die 51. The fixed die is supported by a rigid horizontal table 52, forming a part of the machine frame, the movable die being reciprocated by power mechanism hereinafter described.

As indicated by Figs. 2, 4, the machine frame includes a base portion 53, above which the table 52 is supported by suitable frame parts.

The die 50 comprises a foraminous element 54, shaped to constitute the molding surface for one side of the article to be molded, and preferably composed of finely perforated sheet metal.

This element is attached to a die base 55, seated on the table 52. The die base is formed with the ribs 56, on which the foraminous element 54 is supported, the arrangement of the ribs being such that bending of the die surface is prevented, and shallow chambers 57 are formed between the ribs into which the water expressed from the molded plate, passes through the foraminous member 54, and is discharged as will be presently described.

The movable die 51 is similarly formed and comprises the foraminous element 58 attached to the holder 59, which is provided with ribs similar to and for the same purpose as the corresponding ribs 56 on the die base 55, a shallow chamber 60 being thus formed between the foraminous element 58 and the holder 59, to receive water expressed from the upper side of the plate. The die holder is secured to the carrier 63 which is reciprocated toward and from the lower die by mechanism to be presently described, to co-act therewith for the purpose of expressing surplus water from a charge of pulp to mold the required article.

The lower die base 55 is seated within a housing 64, the purpose of which will be hereinafter described, and the dies are replaceable with dies of other forms within the predetermined capacity of the machine, without interference with or change in other elements, suitable means being provided to adjust the action of the machine to the particular dies used.

The lower die base 55 is provided with an upstanding annular curb 65, projecting above said die and forming therewith a reservoir to receive a charge of pulp supplied by means including a pulp box 66 called a flow box, Figs. 1, 4, 5, 6, which is caused by means presently described, to pour a charge of semifluid pulp into said reservoir while the upper die 51 is raised.

The upper die carrier 63 has a shank portion 67 which is connected with a vertically reciprocated cross head 68, Figs. 1, 2, 4, 5, constituting a member of the mechanism whereby the upper die carrier is reciprocated, to cause the coaction of the dies. Said mechanism includes vertical slides 69 connected with the ends of the cross head 68 and movable in fixed guides 70, a toggle composed of links 71 and 72, Fig. 8, pivotally connected at 73, the link 71 being pivoted at 74 to a fixed support 75, while the link 72 is pivoted at 76 to the slide 69, a lifting lever 77 pivoted at 78 to a fixed support and connected by a link 79 with the meeting ends of the toggle links, and a lifting cam 80 on a power driven cam shaft 37 journaled in fixed bearings 82. A trundle roll 83 on the lifting lever 77 is adapted to bear on the perimeter of the lifting cam.

When the lifting cam is in the position shown by Fig. 8, the upper die is held in the raised position by the described mechanism, and as the cam is rotated the upper die is depressed, and enters the reservoir of the lower die, a cam 81, engaging the trundle roll 830 on the meeting ends of the toggle links, operating to exert pressure on a charge of pulp therein, against the lower die.

The connection between the upper die carrier shank 67 and the crosshead 68 is preferably adjustable, so that the height of the starting and stopping points of the upper die may be adjusted to vary the thickness and density of the article molded. To this end a threaded stud 84 is fixed to the shank 67 and is slidable in a sleeve 85, which is fast to the crosshead 68. Adjusting nuts 86 threaded to engage the stud 84, are adapted to bear on opposite ends of the sleeve 85, and the stud may be raised or lowered relative to the sleeve, and the upper die adjusted to the required position in relation to the lower die.

The housing 64 surrounds the die 50 and receives the overflow of pulp supplied from the flow box in excess of the required charge, and also the wash water supplied to flush the mold and keep the drainage surface free from obstruction. The housing is formed with a channel 87 discharging through the opening 88, into a trough 89 having a suitable outlet. Openings 90 connecting with a chamber 104 formed in the base 52, permit the escape of wash water from the mold 50, as will be described.

Figures 5, 6:
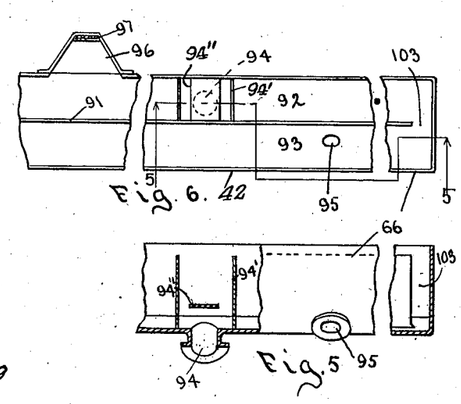
Fig. 5 is a fragmentary elevation of the supply main for the raw material.
Fig. 6 is a plan of the same.

With particular reference to Figs. 1, 5, 6, the flow box I prefer to use in connection with the battery assembly, is formed as a trough having a partition 91 dividing the box laterally into two conduits 92, 93, the former constituting the supply box, the latter the overflow, the partition being interrupted at either end, and the supply inlet 94 and the discharge outlet 95 being positioned suitably to secure a continuous flow from the supply main 39, through the branches 40, 41, to the respective flow boxes supplying a line of machines, and around the end of the partition into the overflow conduit 93, thence through the respective branches 44, 45, to the return main 46. To insure uniform flow of the pulp in each direction in the conduit 92, I provide baffle plates 94' arranged in suitable relation to the inlet 94, to deflect the stream in both directions, to supply the machines on either side of the inlet of the particular conduit, a protecting plate 94" being also provided to break the current from the inlet 94. The foregoing means for pulp supply are subject to modification to meet particular requirements, location and number of machines, without exceeding the scope of the appended claims.

A continuous flow of pulp is maintained through all parts of the flow box 66 by the described means, all portions of the pulp being kept in circulation and maintained in a condition of uniform fluidity, so that there is no liability of the formation in the flow box, and the introduction into the mold reservoir, of pulp fibres in small balls or masses denser than the main body. This liability would exist if no provision were made for keeping all parts of the pulp in the flow box in constant circulation, or progressive movement, and if there were dead spaces in the flow box in which pulp fibres may accumulate. Lack of uniform fluidity of the charge of pulp in the lower die reservoir is a serious objection, because a plate molded therefrom would not be of uniform thickness and density, and would have portions excessively compressed causing discoloration, excessive brittleness at the denser portions, and other objectionable results, all of which are avoided by keeping all portions of the pulp in continuous progressive movement in the flow box, and delivering the pulp to the die reservoir in a stream flowing through the air and not through a conduit having walls in frictional contact with the moving pulp and liable to cause fibers thereof to accumulate and form relatively dense portions.

The several molder units of a battery of machines are supplied with liquid pulp from the flow box by means and in the manner I will now describe. The flow box for a line of machines extends along the back side of such machines, and at a level relative to the molding die reservoirs such that charges of pulp may be supplied thereto, chutes 96, Figs. 6, 8, being provided opposite each molder unit through which charges of pulp, released from the flow box by means presently to be described, will flow by gravity into the respective die reservoirs.

The charge is released by a vertically sliding molder gate 97, Figs. 6, 8, serving as a closure and movable in guides at the outlet end of the chute. This gate is automatically opened by suction caused by a partial vacuum in a vacuum tube 98, Figs. 4, 8, constituting one of the air conduit portions of the air-conducting system. The vacuum tube 98 communicates with a fixed vacuum cylinder 99 and through pipe connections 140, with the exhaust main 47, Fig. 1, from the exhauster 47a.

The air conducting system similarly connects with devices for transferring the molded article from the molder unit to the drier unit, and with other devices for removing the finished article from the drier unit, and the opening of the gate is dependent on the functioning of these devices, all of which will be hereinafter described, and their coordinate functions explained. The molder gate 97 is connected to a piston 100, movable axially in the vacuum cylinder 99, Fig. 8. When air is exhausted from the vacuum cylinder the piston rises and opens the molder gate 97 to an extent determined by an adjustable stop screw 101 in the closed end of the cylinder, provision being thus made for varying the charge. The charge is released while the upper molder die is raised, and flows by gravity into the reservoir of the lower die, a sufficient supply of pulp being maintained in the flow box, in continuous current, to insure an excess of liquid pulp to constitute a uniform head in the flow box, the surplus pulp flowing through the opening 103, Figs. 5, 6, at either end of the partition 91 into the return conduit 93, thence through the outlet 95, branches 44, 45, to the main 46, Fig. 1, back to the source of supply. Suitable gates 105 may be provided by means of which the current of surplus pulp may be restricted and a uniform head of pulp maintained in the flow box which may be that indicated by the line 106, Fig. 8. After the release of the charge, the vacuum valve, presently to be described, controlling the vacuum in the tube 98 and cylinder 99, is closed, and a spring 102 closes the molder gate.

The upper molder die carrier 63 and its shank 67 contain a passage 110, Fig. 9, which has two functions. One function is to conduct water to the upper die chamber 60, when the upper die is raised, for the purpose of conditioning said die by removing pulp fibers from its perforations, and leaving its forming surface suitably wet. Water is admitted to the passage 110 by a flexible hose 112 connected with a fixed water supply pipe 113, as shown in Fig. 4, said pipe being a member of a pipe line which includes a pipe 114 connecting with the main 48 from a source of water supply.

The supply of water to the upper molder die and to the lower molder die, as will be described, is controlled by a valve 115 in the pipe line 113, actuated by means hereinafter described to function in coordination with the molding process. Similarly, the pipe line 113 is connected with the chamber 116 in the lower die base 55, Figs. 8, 9, for the same purpose.

Explanation of the second function of the passage 110, and further explanation of the operation for conditioning the dies, will be made in due sequence in this description.

The air conducting system includes a number of connected conduit portions, one of which has been noted. Another portion, connected with the main 47 by the pipe 117, Figs. 8, 10, is formed by the interior of a hollow leg 118 rising from the base 53.

The table 52 is formed with another conduit portion 127 communicating with the portion 118, and a chamber 121 is formed in the die base and communicates with the portion 127, through a port 122, Figs. 8, 9, 10, surrounded by a valve seat 123, on which a valve 124 is seated by a spring 132, acting on a valve stem 119, movable in a fixed guide 125. The valve 124 will hereinafter be designated as the lower molder valve, and its function will be described later.

Another conduit portion is formed by the bore of a fixed vertical lower valve pipe 126, fixed to the table 52 and connecting with the conduit portion 127 formed therein and rising therefrom beside the lower molder die, as shown by Figs. 8, 9. The lower valve pipe 126 has a stuffing-box 128 at its upper end in which is slidable an upper vertical valve pipe 129, whose upper end is fixed to the carrier 67 of the upper molder die 51 and communicates with the passage 110 therein, the second function of this passage being to conduct moisture laden air from the die chamber 60 to the upper valve pipe 129, hereinafter described, vacuum being created in this pipe to withdraw air and moisture from the passage 110, and thus suitably reduce the moisture content of the plate to prepare it for drying by the drier dies. The lower end of the upper valve pipe is closed by a head 130, and said pipe is provided with air ports 131 spaced above the head.

The valve pipes 126 and 129 collectively constitute a telescopic conduit portion which is open to the atmosphere, as shown in Fig. 9, when the upper die carrier is raised, the ports 131 being then above the stuffing-box 128.

When the upper die is lowered to its forming position, the airports 131 are below the stuffing-box so that the two valve pipes become a continuous air conduit portion between the passage 110 and the conduit portion 127, and air is exhausted from the suction chamber 60 to cause adhesion of the plate to the upper die by suction, the lower valve 124 being at this time closed so that there is no vacuum in the chamber 56 of the lower die, and remaining closed until the ports 131 rise from the stuffing-box 128. Vacuum is therefore maintained in the upper die chamber 60 during the first part of the upward movement of the upper die, and until the plate is separated from the lower die and is caused by the vacuum in the upper die chamber 60 to so adhere to the upper die that when the vacuum in the upper die chamber is broken by air entering the ports 131, the plate clings so lightly to the upper die that it may readily be removed therefrom by the transfer arm, as will be described later. The lower valve 124, normally closed by its spring 132, is opened as the ports 131 approach the stuffing box 128, in the upward movement of the conduit 129, to admit air to the conduit portion 126 and thus assist in breaking the vacuum in the upper die chamber 60.

The valve 124 is opened by mechanism which includes a lever 135, pivoted at 136 to a fixed ear 137, Figs. 4, 8, and provided with a trundle roll 138, which is raised against the stress of the spring 132 by a cam 139, fixed to the cam shaft 37.

Figures 11, 12, 13:
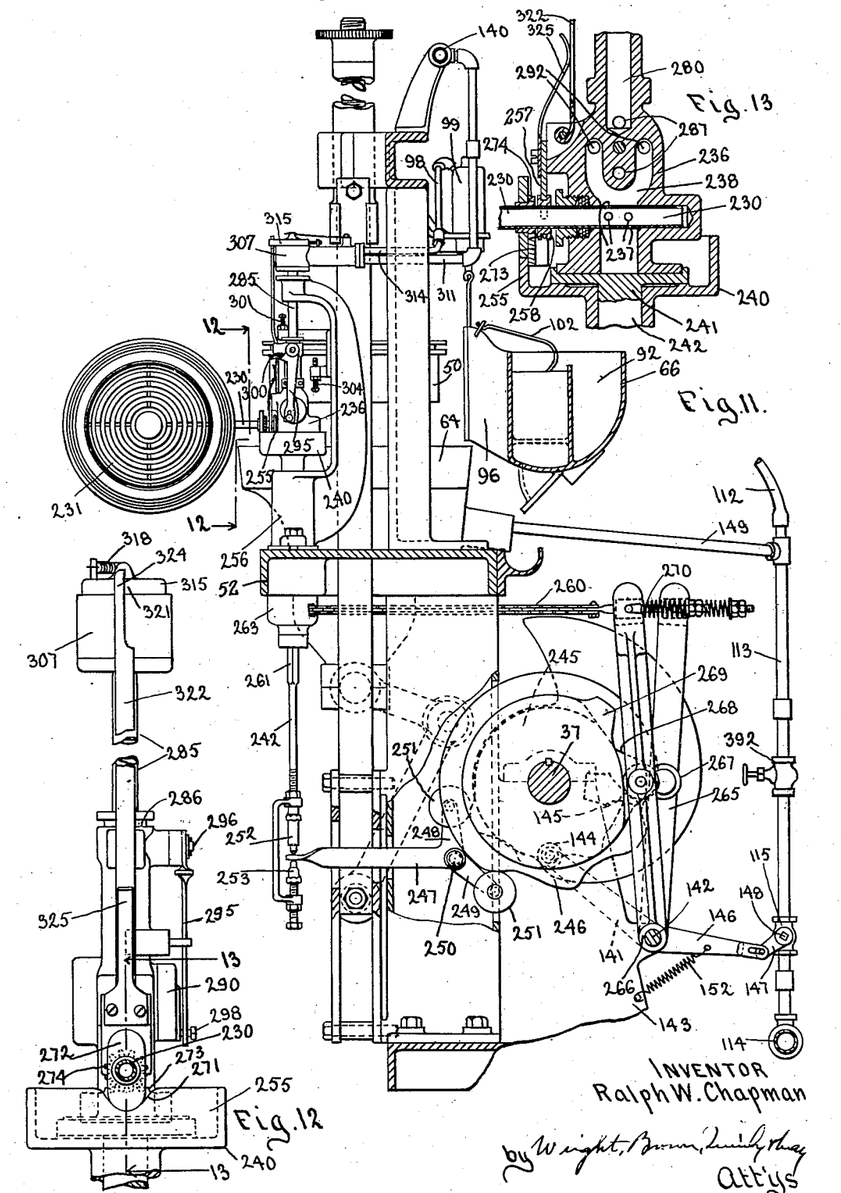
Fig. 11 is an enlarged sectional end elevation on the line 11—11, Fig. 2.
Fig. 12 is a further enlarged fragmentary front elevation on the line 12—12, Fig. 11.
Fig. 13 is a still further enlarged sectional fragment on the line 13—13, Fig. 12.

The water pipe line which includes the pipe 113 supplying conditioning water to the molding dies, as above described, includes the main supply pipe 48, Fig. 1, connected with the pipe 114, the supply to each molding unit being controlled by a valve 115, which is opened and closed at suitable periods by mechanism including a lever 141, Figs. 4 and 11, pivoted at 142 to a fixed support on the leg 143, one arm of said lever having a trundle roll 144 in the path of a dog 145, which for convenience I have secured to one face of the cam 81. This dog is substituted for a cam for the same purpose to economize space on the cam shaft. The other arm 146 of the lever 141, engages the lever 147 secured to the valve stem 148 of the valve 115.

The dog 145 acts on the lever 141 to open the valve 115, admitting water to the pipe line 113 and through the connecting pipes 112 and 149 respectively to the upper and lower molds. In the former the water enters the shallow chamber 60 and is sprayed through the foraminous member 58, escaping by gravity into the lower mold reservoir formed by the curbing 65, and in the latter, the water is admitted to the chamber 116 in the die base 55, and passes through the drainage perforations 151, and sprays through the foraminous member 54, the main volume escaping into the chamber 150 of the housing 64 and thence through the openings 90 into the vacuum conduit 127, and any escaping from within the curbing 65, passing through the channel 87 in the housing to the waste trough 89. The action of the dog 145 on the lever 141 is brief in duration and timed to admit conditioning water to the dies in the interval between the removal of the molded article, and the admission of a succeeding charge of pulp as will be described in due time. A spring 152 operates on the lever 141, to quickly close the valve 115 when the dog releases engagement with the trundle roll 144. Previous to explaining the means for removing the article from the molding dies. the drier element will be described.

Figure 20:
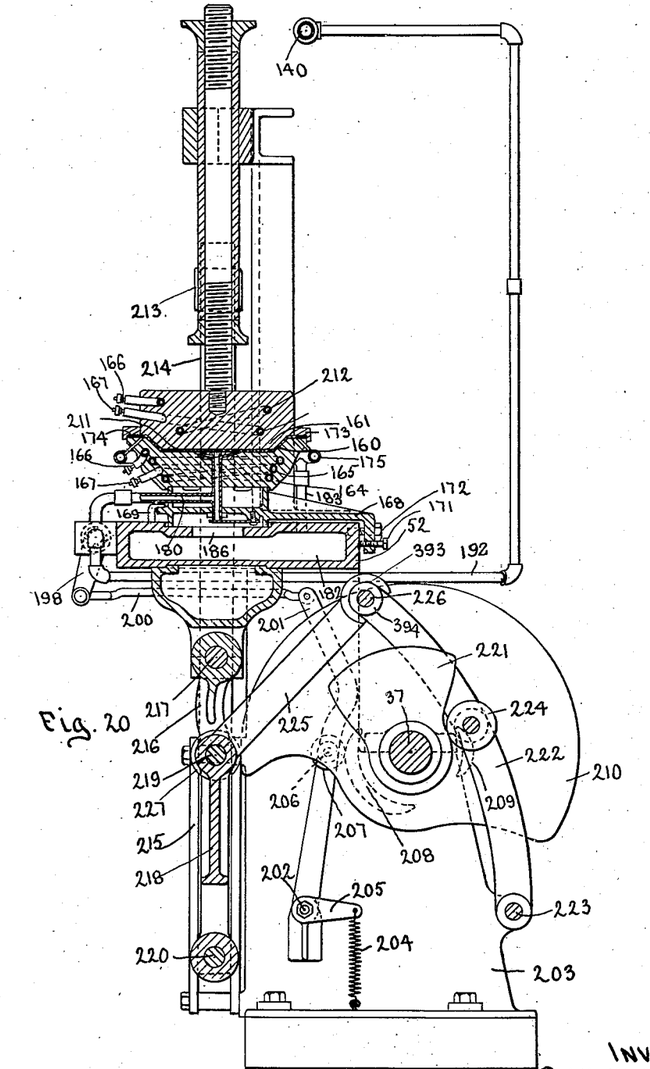
Fig. 20 is an enlarged sectional elevation on line 20—20, Fig. 2.
Figure 21:
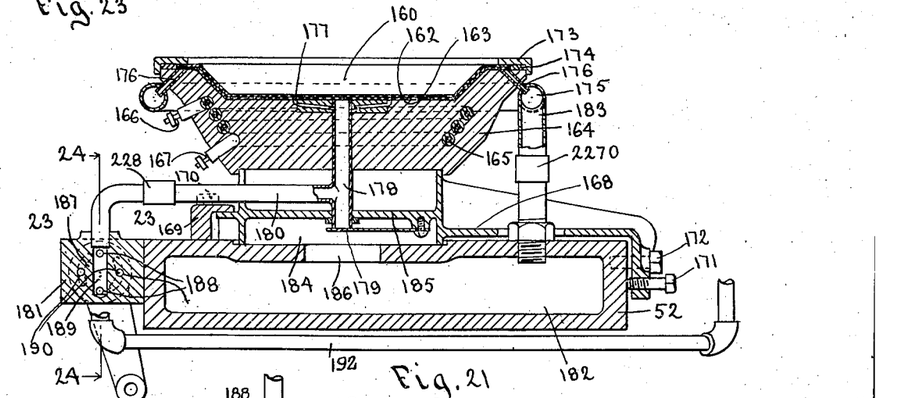
Fig. 21 is a further enlarged sectional elevation of the lower drier mold, and vacuum connections.
Figures 22, 23:
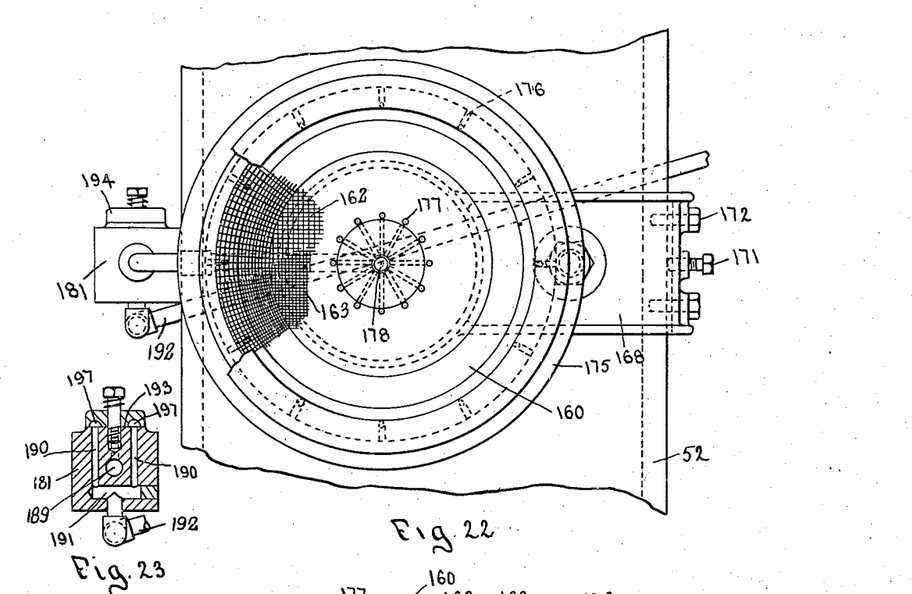
Fig. 22 is a plan of the same.
Fig. 23 is a section of the vacuum valve on line 23—23, Fig. 21.
Figure 24:
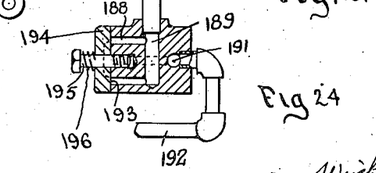
Fig. 24 is a section of the vacuum valve on line 24—24, Fig. 21.

The drier member of each unit shown in section by Fig. 20, includes a fixed lower die 160, and a movable upper die 161, the lower die being also shown enlarged by Figs. 21, 22. Said dies are heated and have opposed plate forming contours similar to those of the molder dies. The lower drier die is composed preferably of an outer or bottom layer 162 and an inner or top layer 163. Said layers may be of wire gauze of such mesh that the openings in the top layer are considerably smaller than those in the outer layer, in order to give as smooth a finish as possible to the contacting side of the molded plate, the top layer being preferably of about 80 mesh, or finer, and the bottom layer of about 60 mesh. Perforated sheet metal may be employed for the bottom layer, if desired, its perforations or openings being larger than those of the top layer.

I prefer to use electrical resistance heating elements for heating such dies, and in Fig. 20 and particularly in Figs. 21, 22, I have shown and will describe a drier unit including this means for heating. The foraminous elements 162, 163 of the lower drier die 160, are seated in base 164, in which is embedded or inserted a helically formed heating element 165 of resistance wire suitably insulated.

Terminals 166, 167 are provided to which are connected, wires from a source of electrical supply, to form a circuit through the element 165. The movable die 161 is heated in a similar manner, and will be described later. The die base 164 is supported on a frame 168 which I secure to the table 52 by the clamps 169 having clamp screws 170 tapped into the table. I provide this frame with an adjusting screw 171, acting in conjunction with the bolts 172, by means of which fine adjustment in the axial position of the die 160 relative to the die 161 may be made.

The foraminous elements 162, 163, are clamped to the die base by means of a clamping ring 173, a packing ring 174 of asbestos or other suitable material cooperating therewith to prevent the escape of steam about the peripheries of the foraminous dies. An annular drainage conduit 175 surrounds the die, and into it discharge the plurality of ducts 176 leading from the under side of the flange of the foraminous die members.

Other ducts 177 lead from points near the middle of the under side of the foraminous die members to a conduit 178.

This latter conduit is provided with a yielding closure 179, and a branch 180 connecting with a vacuum valve 181, the construction and purpose of which will be presently described. The table 52 is formed with the chamber 182 into which the drainage conduit 175 discharges through the pipe 183, and a chamber 184 is formed within the frame 168 by a partition 185, through which projects the conduit 178, the yielding closure permitting the steam and heated water expressed from the molded article in finishing, to escape into the chamber 184, from which it passes through an opening 186 into the chamber 182. Instead of connecting the chamber directly with the exhaust fan of the air system, it is found advisable to connect the chamber 182 with the chamber 127 pertaining to the molder unit, by pipe connections not shown, in order that the heat from the steam and hot water expressed in the drier unit may be conserved to maintain a heated condition of the table in the vicinity of the drier unit. The vacuum valve 181 is secured in a suitable manner to the table 52 and comprises a body 187 having passages 188 communicating with a main duct 189 to which the conduit 180 is connected, and other passages 190 communicating with another duct 191, connecting through piping 192 with the air exhauster 47a above described.

The several passages extend to a common face 193 of the valve body on which is seated a valve 194, journaled on a stud 195 and yieldingly pressed against the face 193 by the spring 196. This valve is provided with segmental ports 197, shown by dotted lines in Fig. 21 and in full lines in Fig. 23, at opposite sides of its center. When the valve is in the open position shown, in Fig. 20, the ports connect the passages 188 and 190. When the valve is turned by the described mechanism to its closed position, the ports 197 are separated from the passages 188 and the vacuum is broken, as shown in Fig. 21.

This valve is operated in coordination with the pressing action of the dies 160, 161, to connect the die 160 with the air conducting system, a partial vacuum being established that immediately removes steam and vapor from the under side of the article within the mold, insuring rapid drying.

The valve 194 is operated in the following manner:— Swiveled at one end to the lever 198 is a pitman 200, similarly swiveled at its other end to the lever 201, journaled to a fixed stud 202 projecting from the frame member 203, the spring 204 secured to the arm 205 rigid with the lever 201, exerting a yielding tension to retain the lever in position in which the valve is closed. Journaled on a stud 206 projecting from the lever 198, is a trundle roll 207 in the path of cam elements 208, 209, for convenience secured to one face of the compressing cam 210 secured to the shaft 37. The arrangement is such that the vacuum valve 194 is opened by the cam element 208 to cause vacuum in the chamber of the lower drier die while the plate is under final compression between the upper and lower dies, and remains open to hold the plate on the lower drier die while the transfer arm is leaving said die, the valve being closed to break the vacuum in the lower die chamber and permit the removal of the plate from the lower die by the pickoff arm, as will be presently described. The second cam element operates to cause a suction that will remove a molded article from the transfer arm as it engages the die, the latter function being described later.

The movable upper drier die 161, Fig. 20, is a metal block having a polished bottom face 211 which is rustless and conforms to the top face of the lower die. This die is heated, preferably by an electrical resistance element 212, similar to the element 165 heating the lower die, and is reciprocated by mechanism similar to that provided for reciprocating the upper molder die. Said mechanism includes a crosshead 213, attached at its ends to vertical rods 214, slidable in fixed vertical guides 215 on the machine frame, and a toggle composed of an upper link 216, pivoted at 217 to a fixed part of the frame, and a lower link 218, pivoted at 219 to the upper link, and at 220 to the rods 214.

Said mechanism includes also means for operating the toggle to raise and lower the upper die, said means including a lifting cam 221 on the cam shaft 37, a lever 222, pivoted at 223 to a fixed support on the frame member 203 and provided with a trundle roll 224 running on the lifting cam, and a link 225, jointed at 226 to the free end of the lever 222, and connecting it with the pivot 219 of the toggle links.

The lifting cam 221, after lifting the upper die, permits it to quickly drop by gravity to an initial position on a moist plate deposited by the transfer arm, as will be explained, in the lower die. The upper die is then positively pressed downward to compress and complete the molding of the plate by a compressing cam 210 on the cam shaft 37, the acting portion of said cam bearing on a trundle roll 227 on the knuckle of the toggle links, and being slightly eccentric to the shaft, so that it is adapted to impart a suitable compressing pressure to the upper die, the movement imparted by the compressing cam to the trundle roll 227 being preferably not more than one inch. For example, when the dies are electrically heated, the heating element of the lower die carries approximately fourteen hundred watts, and the heating element of the upper die carries approximately five hundred watts.

When the upper drier die contacts with a moist plate on the lower die, steam is generated and pressure created in that part of the plate next to the imperforate polished surface of the upper die, which forces the liquid content of the plate downward through the foraminous die, with the result that a considerable part of the moisture content, perhaps 40%, is expelled through the duct 178 as free water, and almost instantly. The valve 194 is closed at this point, so that the moisture content remaining in the plate, is confined therein and becomes saturated steam, which is superheated in the plate by the heat of the dies. This closing of the valve is not an obligatory step, from the point of view of the generic invention. It is considered to be of advantage in operation when the dies are heated highly enough to effect extremely rapid drying, in order to prevent surface discoloration of the plate by heat; the layer of superheated steam which is thus caused to exist between the impervious die and the adjacent surface of the plate having this effect. The confined pressure tends also to force the fibers in the pulp together and secure a firm bond between them. The action is so rapid that the water and steam escape through the conduits into the chamber 182 under pressure as a blow out, the closure 179 yielding, and functioning as a safety valve to permit the escape of surplus water and steam not exhausted through the conduit 180.

No steam from the table or the conduits is returned to the dies, and there being substantially no space for steam or moisture in the dies outside of the article itself, such steam or moisture as remains therein is quickly raised in temperature to a superheated condition, and the article is within a few seconds ready for removal with a moisture content practically negligible. Tests have shown that while various lengths of time are required to dry plates of different dimensions under different conditions of heating and pressure, in certain conditions the initial blow out is performed in less than a second, with a reduction of the moisture content of 40 to 50 percent, and that in five seconds from the application of pressure a plate may be dried to a moisture content of approximately one percent.

The dies shown in the drawings are shaped to produce a plate of predetermined size and form, and are interchangeable to produce different sizes and forms of plates, bowls and the like, without change in operative connections other than by adjustment, the combinations of elements pertaining to the dies, alone being changed. These combinations are interchangeable and adapted to be suitably secured in position, and the connections made to the conduits of the drier by means of right and left pipe couplings, or unions 2270, 228.

It will be noted that the plate to be produced by the particular dies shown, is molded with the concave surface downward, and that it is finished in the drier dies in reversed position, and I will now describe the means I employ for transferring the article from the molding dies to the finishing dies.

The transfer arm which withdraws a moist plate from the upper molder die, and deposits it on the lower drier die, and mechanism operating said arm, are shown in detail by Figures 11 to 19.

The transfer arm is composed of a horizontal vacuum tube, or tubular arm member 230, and a transfer die 231 fixed to the outer end of said arm member and shaped to conform to the exposed surface of a moist plate held on the upper molding die. The transfer die 231, Fig. 7, consists of marginally united inner and outer dished disks 232 and 233, the outer disk being foraminous and preferably of perforated sheet metal. The inner disk, which is imperforate, is fixed to the tubular arm member 230, and has a central opening 234 communicating with the bore of said member. Said disks are spaced apart to form a vacuum chamber 235, from which air is exhausted at intervals to cause adhesion of the plate to the transfer die.

Figure 7:
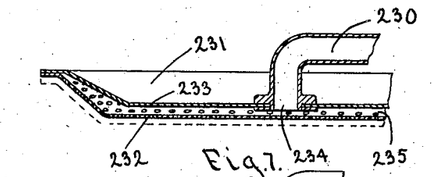
Fig. 7 is an enlarged sectional fragment of the transfer die.
Figure 7A:
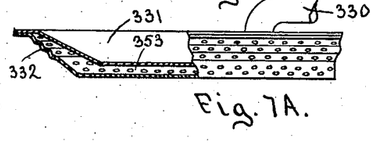

The transfer arm-operating mechanism, next described, is organized to present the foraminous disk 232 of the transfer die when said die is inverted from the position shown by Fig. 7, to an inverted plate on the upper molder die when the latter is raised, create vacuum in the chamber of the transfer die, thereby causing adhesion of the plate to the die, lower the transfer arm, swing said arm forward from a position between the molding dies to a position between the drier dies, semi-rotate the transfer arm while it is swinging forward, to cause its foraminous disk 232 and a plate thereon to face downward, deposit the plate on the lower drier die, break the vacuum in the transfer die chamber to leave the plate on the lower drier die, and swing back to a position between the molder and drier dies, preparatory to the transfer of another plate.

Said mechanism is organized also to create vacuum in the gate vacuum cylinder 99, and thereby cause the opening of the flow box gate 97, and break the vacuum to permit the closing of the gate by the spring 102.

One end of the tubular member 230 of the transfer arm is journaled in bearings in a transfer arm carrier 236, and is provided with air holes 237 as shown by Fig. 13 connecting the arm with an air passage 238 in the carrier. The carrier 236 is a vertically elongated casting movable up and down and adapted to turn or partly rotate on a vertical axis, a sprocket 239, Figs. 18, 19, being an element of means for turning the carrier to swing the transfer arm horizontally. The carrier 236 is moved up and down by an elevator which includes a non-rotating lower element 240, and an upper member 241 bearing on the lower section and adapted to rotate. The carrier 236 is fixed to the rotary member 241, which includes the lifting rod 242, journaled in the shank 243 of the member 240. The lifting rod is vertically reciprocated by means including cam members 245, 246, Figs. 4, 11, on the cam shaft 37, a lifting rod lever 247 oscillated by said cam, the lever being formed with arms 248, 249, and pivoted at 250 to a fixed support, the arms being provided with trundle rolls 251 cooperating with said cams. Terminals 252, 253 connected with the lifting rod, bear on opposite sides of the outer arm of the lifting rod lever.

Figures 14, 15, 16, 17:
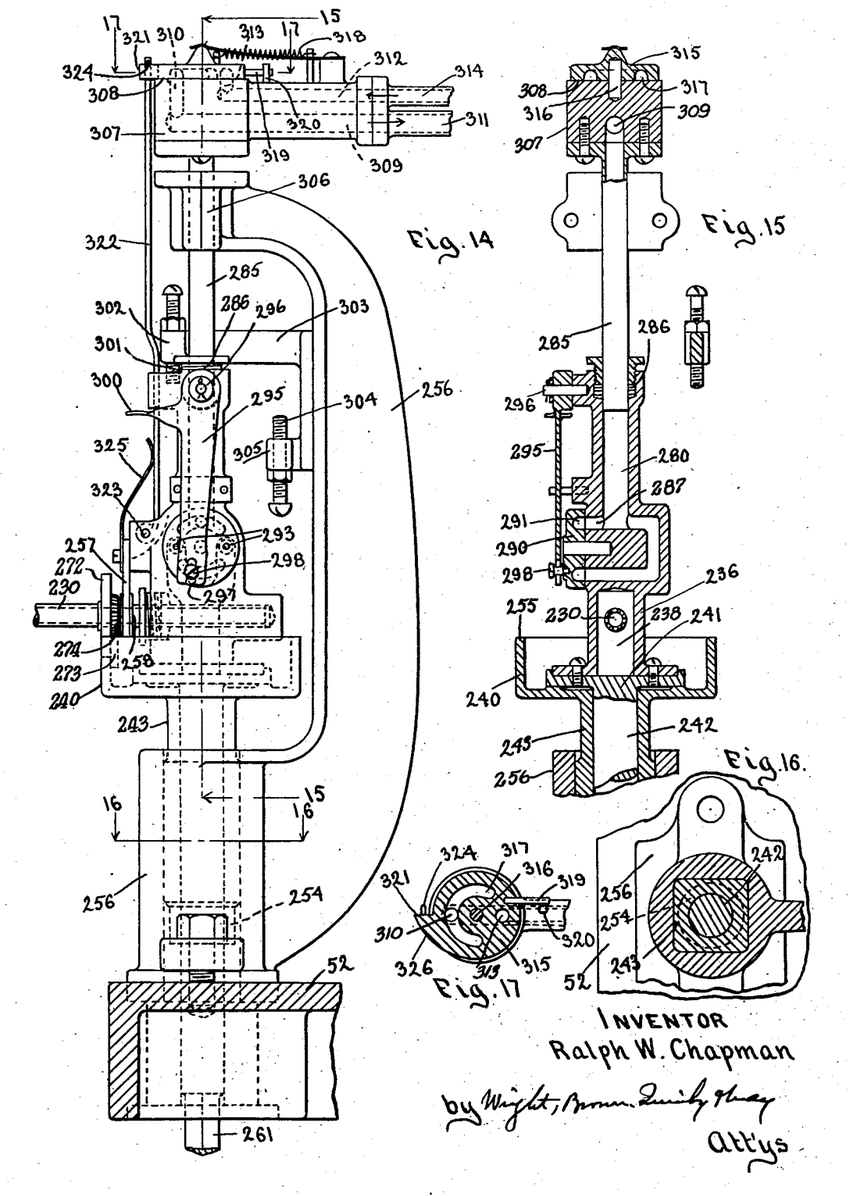
Fig. 14 is an enlarged elevation of the transfer means shown in Fig. 11.
Fig. 15 is a sectional elevation on line 15—15, Fig. 14.
Fig. 16 is a sectional plan on line 16—16, Fig. 14.
Fig. 17 is a sectional plan on line 17—17, Fig. 14.

To the lifting rod 242 is secured a collar 254, Fig. 14, which engages the end of the shank 243 and imparts vertical movement to the element 240, supporting and imparting vertical movement to the carrier. Said shank is a part of a casting which includes an annular flange 255, whose upper edge constitutes an annular horizontal track surrounding the lower end of the carrier and guiding the tubular member 230 of the transfer arm in its swinging movements.

The shank is externally square and prevented from rotating while moving vertically by the fixed base of a vertical standard or bracket 256, Fig. 14, fixed to the table 52, said base having a square bore guiding the square hub vertically. The tubular arm 230 is confined against end play in its bearings by a confining ear 257, Fig. 13, fixed to the carrier and entering a groove in a collar 258, fixed to the member 230.

The carrier is rocked or reversely turned on its vertical axis to swing the transfer arm by transfer mechanism shown by Figs. 12, 13, 14, 18, 19. Said mechanism includes a looped sprocket chain 260, engaging the carrier sprocket wheel 239.

Figure 18:
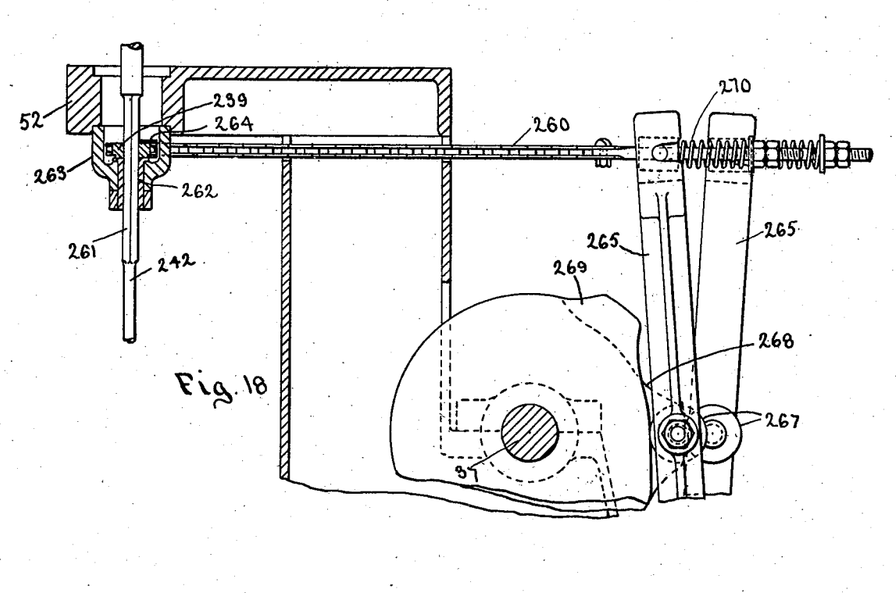
Fig. 18 is a sectional elevation on 18—18, Fig. 19, of the rotating means for the transfer member.
Figure 19:
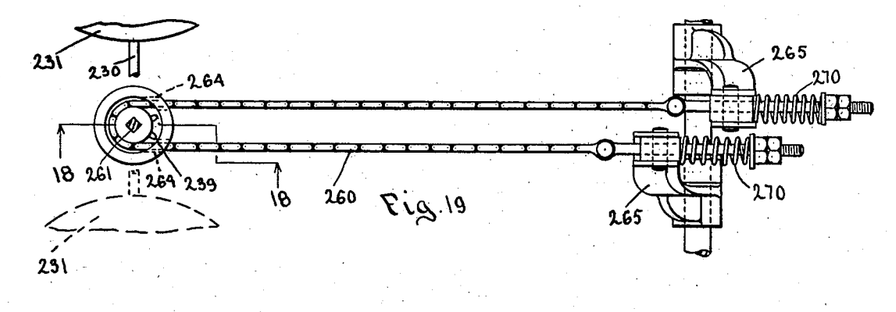
Fig. 19 is a plan of the same.

The lifting rod 242 is formed in a part of its length with a squared portion 261, which is slidable in the bushing 262, Fig. 18, journaled in the holder 263 secured to the under side of the table 52. The sprocket 239 is seated on the upper end of this bushing and slidably engages the squared portion 261 of the lifting rod 242. Openings 264 in the holder 263 permit the passage of the sprocket chain 260 to engage with the sprocket 239, and through the means to be described, the sprocket is rotated, and through the intermediate lifting rod and carrier 236, the molded article is transferred from the molding dies to the finishing dies. The chain extends through openings in the holder 263, Figs. 11, 18, 19, and its ends are engaged with two oppositely oscillating transfer levers 265, pivoted at 266. Trundle rolls 267 on said levers cooperate with cam members 268, 269 of cam bodies on the cam shaft 37. Springs 270 act on the transfer levers to press their trundle rolls against the cam members, and tension the sprocket chain.

To semi-rotate the transfer arm, while it is swinging, and thus cause the transfer die to face alternately upward and downward, I provide the means shown by Figs. 12, 13, and 14.

The annular track flange 255 is provided with a recess 271, and the tubular member 230 of the transfer arm is provided with an elongated reversing slide 272, having flat side faces at opposite sides of its major axis, and rounded end faces, each adapted to enter the recess 271.

To the track flange is fixed a horizontal rack 273, extending across the recess, and arranged to mesh with a reversing gear 274, on the arm member 230, when the transfer arm is swinging across said recess.

The arrangement is such that during an initial swinging movement on the transfer arm in one direction, one of the flat sides of the reversing slide moves on the annular track, so that the transfer die is supported horizontally until the slide reaches the recess 271. One of the rounded ends of the slide then enters the recess, and the reversing gear 274 engages the rack 273. The result is a semi-rotation of the transfer arm, the reversing gear then passing out of engagement with the rack, and the opposite flat side of the reversing slide bearing on the track, so that the transfer die is again supported horizontally.

The up and down movements of the transfer arm carrier and the turning movements thereof on a vertical axis, are utilized in the operation of a transfer vacuum valve which energizes and deenergizes the chamber 235 of the transfer die, and a valve which energizes and deenergizes the vacuum cylinder 99, to cause the opening and release of the flow box gate 97.

In the carrier 236 is a passage 280, Fig. 13, the upper portion of which receives a fixed vertical vacuum tube 285, shown by Figs. 11, 12, 14, 15, slidable in a stuffing box 286 on the carrier. Said vacuum tube and passage constitute a portion of the air-conducting system, the fixed tube also guiding the carrier in its vertical movements. The passage 280 communicates with ports 287 opening on a flat valve seat on one side of the carrier.

The transfer valve designated by 290 is of like character to that shown in Figs. 21, 22, 23, 24, and when the valve is open the segmental ports 291 connect the ports 287 with the ports 292 communicating with the passage 238, and through the transfer arm 230, the vacuum chamber 235 in the transfer die. In this position of the valve, air may flow from the transfer die to and through the vacuum tube 285, and when the transfer die engages the molded article on the movable molding die, suction is established through the perforations in the disc 232 of the transfer die, and a partial vacuum is established in the air connections. When the valve is closed, the segmental ports cease to connect the ports 292 and 287 and there is no current.

Between the segmental ports 291 and on opposite sides of the center of the valve, passages 293, Fig. 14, are provided through the valve, which admit air to the passage 238 and the transfer die chamber 235 when the valve is closed, thus assuring quick breaking of the vacuum in said chamber, so that the pressure of the valve on its seat is balanced and wear is reduced. The valve is opened and closed by a valve lever 295, pivoted at 296 on the carrier 236, and having a slotted swinging end 297 engaged with an eccentric stud 298 on the valve.

The vertical and turning or rocking movements of the carrier cause oscillating movements of the valve lever, and the opening and closing of the transfer vacuum valve as next described.

When the carrier is raised, an ear 300 on the valve lever contacts with a valve opening stop 301, supported by a fixed arm 302 on the bracket 303, secured to the bracket 256, the carrier being at this time turned, so that the stop is in the path of the lever ear 300. The valve lever is thus moved to open the valve.

When the carrier is lowered, the lever ear 300 contacts with a fixed valve closing stop 304 on an arm 305, fixed to the bracket 303, the carrier being at this time turned, so that the stop 304 is in the path of the lever ear 300. The valve lever is thus moved to close the valve.

When the carrier rises it has been rotated by the means described to register axially with the molded plate, which has been raised with the movable upper molding die by the suction action through the exhaust connections 129, 110.

The raising of the carrier is so coordinated with the raising of the movable molding die, that the transfer die is approximately in engagement with the molded article as the suction on the upper molding die is broken by the admission of air through the ports 131 as they emerge above the packing 128 in the conduit 126, and as the upper molding die and the carrier 236 reach the extreme upward movement, the ear 300 coming in contact with the stop screw 301, the valve 290 is opened and suction established through the transfer die.

The vacuum tube 285, constituting an element of means for creating and breaking vacuum in the gate vacuum cylinder 99, is fixed in a clamping sleeve or head 306 on the bracket 256, and to its upper end is coupled a vacuum box 307, having an upwardly facing valve seat 308. A passage 309 in the valve box extends from a port 310 opening on the valve seat, to a vacuum pipe 311 communicating with the air exhauster and constituting a portion of the air conducting system.

Another passage 312 in the valve box extends from a port 313 opening on the valve seat, to a gate pipe 314 communicating with the gate vacuum cylinder 99, through the pipe 98, Figs. 4, 8 and 11.

The gate valve, designated by 315, bears on the seat 308 and is adapted to turn on a central stud 316. Said valve has a segmental port 317, Fig. 15, adapted to connect the gate box ports 310 and 313 when the valve is opened, and disconnect said ports when the valve is closed.

The gate valve is normally closed by a spring 318 holding a pin 319 on the valve against a fixed stop 320 on the vacuum box. From one side of the perimeter of the valve projects a shoulder 321, which is one face of the cam-shaped projection shown by Fig. 17.

When the transfer die has received the molded plate, the carrier is lowered from its upper limit of movement, Fig. 3, to permit the die to be swung outwardly to clear the upper molder die; it is then raised as the swing is continued toward the drier unit, and the valve 315 is opened by the engagement with the shoulder 321, of an elongated oscillating rod or dog 322, pivoted at 323, on the carrier 236, and held in position in which the end 324 will engage the shoulder 321, when the carrier is swung toward the drier dies, a flat spring 325 exerting a yielding tension to retain the dog in this position.

As the swing of the carrier is continued the end of the dog engages the shoulder 321, and the valve is swung on its axis to open and permit exhaust action on the plunger controlling the opening of the pulp gate in the direction of the arrows, Fig. 14, through the passages 309, 312, and raising the pulp gate to supply a charge to the molder dies. As the carrier approaches its lowest position with the transfer die approximately in axial alignment with the drier dies, dog 322 is withdrawn from engagement with shoulder 321, whereupon valve 315 is closed by its spring 318. At the same time the valve 290 is closed by the lever 295 as the ear 300 engages the stop 304, and the vacuum holding the molded article in position reversed from the molding position, is broken by air entering the passages 293 and the molded plate is deposited in the fixed lower drier die. The carrier 236 being now raised to permit the swing in the reverse direction, the dog end 324, as the carrier is swung, engages the cam surface 326 of the valve 315 and the spring 325 yields to permit the dog end to pass over the cam and return to normal position to subsequently engage shoulder 321 on the next cycle.

The pickoff arm which withdraws the finished plate from the lower drier die and drops it for removal, and mechanism for operating said arm, are shown by Figs. 25—29, and next described.

The pickoff arm is composed of a horizontal vacuum tube or tubular arm member 330, and a pickoff die 331, fixed to the outer end of said arm member and shaped to conform to the exposed surface of a dried and finished plate on the lower drier die. The pickoff die resembles the transfer die in that it includes marginally united inner and outer disks, forming a vacuum chamber from which air is exhausted at intervals to cause adhesion of the completed plate to the pickoff die, the outer disk being foraminous and the inner disk having a central opening communicating with the bore of the arm member 330, and being elsewhere imperforate, as in the transfer die. The marginal portion of the outer disk is provided with annular ridges 332, forming narrow annular zones or lines of contact with the plate, adapted to slightly indent the glazed top surface of the latter and prevent leakage of air between the plate and the die into the vacuum chamber of the die when vacuum is established in said chamber.

The pickoff arm is fixed to and movable by an elongated vertical pickoff carrier 333, which is adapted to turn or rock on a vertical axis to swing the pickoff die between the drier dies, and discharging position. The carrier is vertically movable to move the pickoff die downward upon a plate on the lower drier die, and upward to withdraw the plate from the die preparatory to swinging the plate to a discharging position. The picker arm is not invertible, and its tubular arm member is fixed in a tubular nipple 334, projecting from one side of the carrier.

The lower end of the pickoff carrier is fixed to a vertical shaft 335, constituting an element of mechanism presently described, for rotating the carrier on a longitudinal axis, and for raising and lowering it.

The upper end of the carrier is guided vertically by and rotatable on a fixed vertical vacuum tube 336, which is supported by the upper end 337 of a vertical standard or bracket 338 projecting upward from the table 52, the bracket having an offset lower end fixed to the table, and an offset clamping upper end through which said vacuum tube passes. The vacuum tube 336, and a vacuum pipe 339 coupled to the upper end thereof, constitute portions of the air conducting system, the pipe 339 communicating with the air exhauster, through the air main.

The tube 336 communicates with a passage 340 in the picker arm carrier constituting another portion of said system. Said passage includes ports 341, opening on a flat valve seat on one side of the carrier. Bearing on said seat is a discoidal vacuum valve 342, Fig. 26, which is formed and operated to establish and break connection between the vacuum chamber of the pickoff die and the carrier passage 340, and thus alternately energize and deenergize the pickoff die, as described with reference to the transfer die before described. The said vacuum valve turns on a central stud 343, fixed to the carrier, and has segmental ports 344 at opposite sides of its center.

When the valve is turned to its energizing position the ports 344, connect the ports 341 with other ports 345, communicating with the tubular arm member 330 of the pickoff die so that vacuum is created in the pickoff die chamber. When the valve is turned to its deenergizing position, it shuts off said communication and atmospheric pressure is restored in the die chamber to break the vacuum therein. The vacuum valve 342 is provided with open air passages similar to those described in connection with the transfer vacuum valve, and arranged to permit air to enter the die chamber 353 when the valve is closed, the object of these passages being as described with relation to the transfer vacuum valve.

Figures 25, 26, 27, 28, 29:
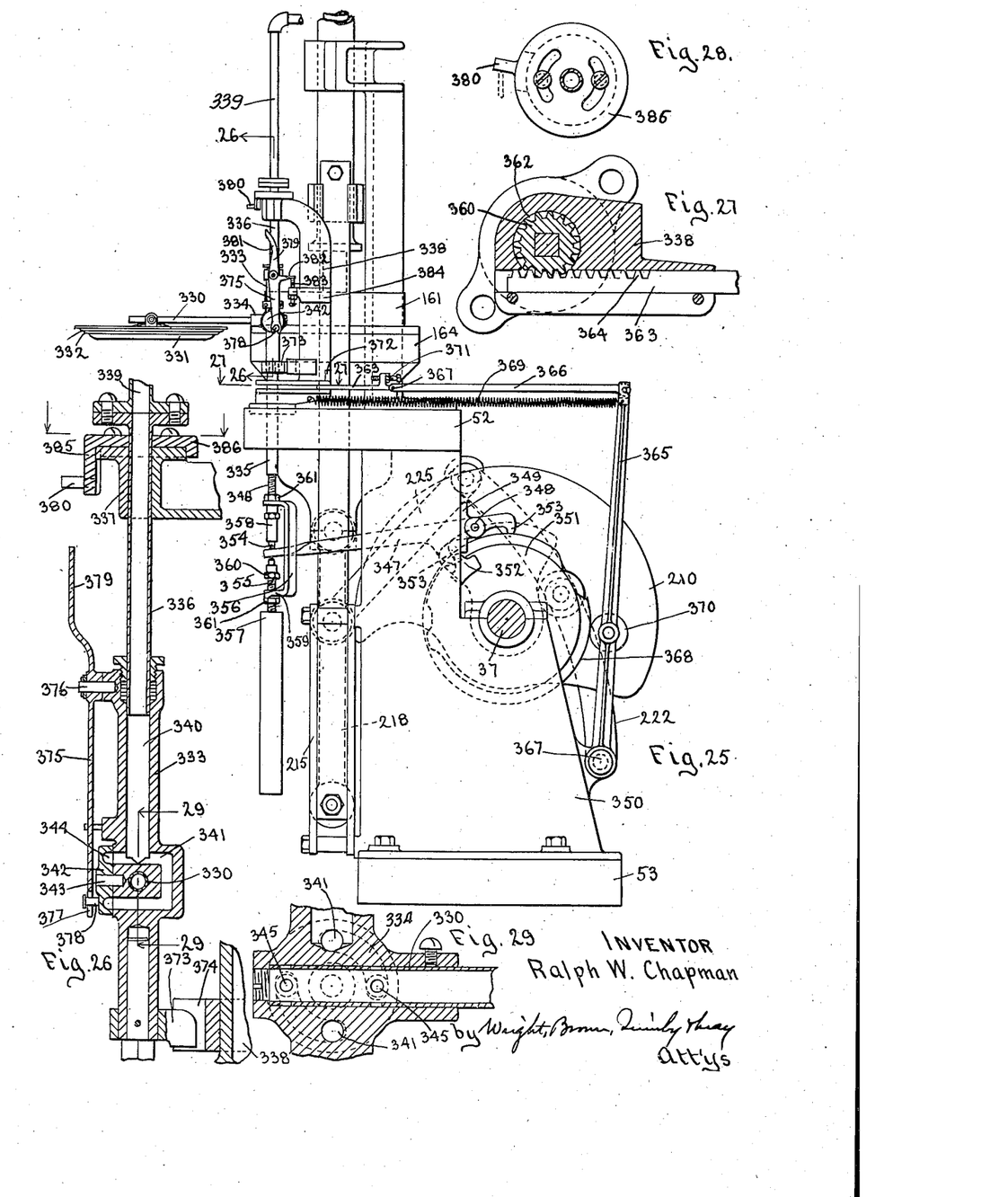
Fig. 25 is an enlarged end elevation in the direction of the arrow 25, Fig. 2.
Fig. 26 is a further enlarged section on line 26—26, Fig. 25, with pickoff carrier rotated to engage plate.
Fig. 27 is an enlarged fragmentary sectional plan on line 27—27, Fig. 25.
Fig. 28 is a plan on line 28—28, Fig. 26, of the abutment for operating the pickoff vacuum valve lever.
Fig. 29 is an enlarged sectional fragment on line 29—29, Fig. 26.

The shaft 335 is moved vertically to raise and lower the carrier by mechanism shown by Figure 25. Said mechanism includes a lifting rod 346, adjustable in the lower end of the shaft 335, a lifting rod lever 347 fulcrumed at 348 on a fixed ear 349 on the leg 350, and a cam 351 on the cam shaft 31. Said cam has a nose portion 352 cooperating with a nose portion 353 on the lever, to impart quick up and down movements to the lever.

The lifting rod 346 is engaged with the outer arm of the lever 347 by means shown by Figure 25, including a lifting rod terminal 354, bearing on one side of the lever and a stud 355 bearing on the opposite side and connected with the lifting rod by a yoke 356 having a weight 357 which accelerates the downward movement of the lifting rod. The said terminal and stud are adjustably connected respectively with the lifting rod and the bracket to cause a close bearing of their rounded ends on the lever, the terminal having a sleeve nut 358 engaged with a thread on the lifting rod, while the stud is formed with a threaded portion engaging a corresponding threaded passage in the hub 359 of the yoke, the stud being formed with a nut 360 by means of which the stud may be turned. Check nuts 361 are provided for preventing accidental rotation of the sleeve nuts.

The shaft 335 is caused to rock the pickoff carrier on a vertical axis, and thus swing the pickoff arm horizontally, by mechanism which rocks the shaft. Said mechanism includes a gear 360, Fig. 27, rotatable in a cavity 362 in the lower end of the bracket 338 and confined therein against vertical movement, the gear having a square central orifice engaging the lifting shaft 335, which is also square, to rotate the shaft and permit vertical movements thereof.

With the shaft is engaged a slide 363, having rack teeth 364 meshing with the gear 360 and reciprocated in guides on the bracket by means including a rack lever 365, Fig. 25, connected with the slide by a link 366, and pivoted at 367 to an ear on the leg 350, a rack lever cam 368 on the cam shaft 31, and a retracting spring 369, connected with the bracket 338 and rack lever 365, and acting to hold a trundle roll 370 on said lever against the perimeter of the cam 368. The slide 363 has an adjustable stop screw 371 which abuts a fixed sop 372 to limit the movement of the slide in one direction.

When the pickoff die is being lowered onto a plate on the lower drier die, an ear 373, Fig. 26, on a sleeve fixed to the lower end of the carrier 333 enters a vertical guiding slot 374 in an arm fixed to the bracket 338, so that the carrier is guided in its downward movement to accurately locate the pickoff die on the plate.

The vacuum valve 342 is operated to energize and deenergize the pickoff die by a two-armed valve lever 375 pivoted at 376 to the upper end portion of the carrier. The slotted end 377 of the lower valve lever arm engages an eccentric wrist pin 378 on the valve. The upper lever arm 379 projects above the carrier and is adapted to be engaged by a valve lever stop 380, on the upper end of the bracket 338, Figs. 25, 26, 28, when the carrier is raised and is turning to swing the pickoff arm from discharging position, to a position over the lower drier die. When the raised carrier is turned on its axis to locate the pickoff die over the lower drier die preparatory to removing a plate therefrom, and is lowered to cause contact of the pickoff die with the formed plate, a curved face 381 on the upper arm of the valve lever contacts with the valve lever stop 380, and has a cam action causing the valve lever to open the vacuum valve, so that vacuum is now drawing through the pickoff die to the vacuum pipe 339. This carrier is now raised to lift the pickoff die and a plate adhering thereto, and is swung outward to a plate-dropping position. The carrier is then lowered to cause an ear 382 on the valve lever to collide with a stationary stop screw 383 on the fixed bracket 384 secured to the supporting bracket 338, and cause the valve lever to shut off the vacuum in the pickoff die and thus release the plate, which now drops completed from said die, and is ready for removal from the machine. The stop 380 is fixed to an arm 385 on a cap 386 rotatively adjustable on the bracket 338 to vary the position of the stop and regulate the movement imparted thereby to the valve lever 375.

The operation of the machine is as follows:— Referring to diagram of movements, Fig. 3. For convenience the cycle is shown as starting with a plate molded and the movable die just starting on its upward movement carrying the molded plate.

As the movable die reaches its maximum upward movement, the plate is engaged by the transfer arm, and the plate is swung outwardly. At this time the conditioning water is admitted for a short interval, and the dies are flushed, removing adhering shreds of pulp and clearing the foraminous faces.

This action ceases before the transfer die swings sufficiently to open the valve controlling the pulp supply. Coordinating with the action so far described, the movable drier die rises, and a finished plate is picked out of the lower drier and swung therefrom by the pickoff device, the cycle being timed so that this operation is complete before the transfer arm has swung sufficiently to interfere.

The pickoff die continues its swing to discharge position, and the transfer die to position for depositing the plate, reversed in transit, in the lower drier die, after which it swings outwardly and dwells as another plate is molded and compressed, the several mechanisms coordinating to mold and finish a continuous succession of plates and deposit them in or on a suitable receiver. Should either the transfer die, or the pickoff die, fail to function, and a molded plate or a finished plate be left in the respective dies, the inrushing air to the vacuum chamber of the respective die, will so lower the vacuum pressure in the air conducting system, that the pulp supply gate will not be opened, and thus a succession of piled up plates will be prevented, in case the operator of the machine is temporarily absent.

As stated hereinbefore it is sometimes necessary to stop one of the machines of a battery, or one unit of a machine, and this may be done as follows:—Referring first to the molder unit, Figs. 8, 11, 18, the connection 79 is formed with a socket 390 engaging the hub 391 of the lever 77, and adapted to be disengaged therefrom and the two elements suitably supported out of engagement with the cam 80. The supply of water to the dies may be controlled by means of a supplementary water valve 392 in the pipe 113, and the turning of the transfer carrier may be prevented by springing the studs connecting the chain 260 with the levers 265, Figs. 18, 19, out of engagement therewith, permitting the levers to be swung away from their respective cams. To prevent raising the transfer arm carrier 236, I release the terminals bearing on the lever 247, permitting it to swing under the action of the operating cams, without affecting the carrier 236.

Similarly on the drier unit, the connection 226, Fig. 20, is formed with a socket 393 engaging the hub 394 of the lever 222, and adapted to be released therefrom in manner similar to that described. The connection 366 may be disconnected with the lever 365, preventing rotation of the pickoff die, and the terminals 354 and stud 355 adjusted to prevent axial movement of the carrier 335. It is not considered necessary to provide for disconnecting the air conducting system other than as operated by the disconnected members, but supplementary valves may be used in connection with the supplying conduits to the particular unit, if it is found advisable.

Having thus described my invention, I claim:—

1. In a pulp molding machine the combination with a fixed molding die and a complemental die movable toward and away from the fixed die having a foraminous molding surface and a passage leading from the rear of said surface, of suction, means including telescopically arranged pipe sections extending parallel to the direction of movement of the movable die, one of which is connected to said movable die in communication with the air passage therein, said telescopic pipe sections being packed against leakage of air and that section which is connected to the movable die having a port arranged to communicate with the atmosphere when the movable die is separated from the fixed die, whereby to break the vacuum at the rear of the molding surface of said die.

2. A machine for making pulp articles comprising a foraminous dryer die, provided with heating means, an imperforate dryer die provided with a smooth pressing face complemental to the foraminous face of the fixed die and with heating means, one of said dies being movable toward and away from the other, power mechanism for so moving said movable die, and an air conducting system including conduit portions communicating with the openings through the foraminous die, the latter die having separate outlets leading respectively into different parts of the air conducting system.

3. In a machine for making molded articles out of matter containing a large proportion of water, a die having a foraminous contact surface and a supporting structure including heating means, said supporting structure including peripherally arranged outlets and centrally arranged outlets, fluid conduction means connected with said peripherally arranged outlets and vacuum means connected with said centrally arranged outlets.

4. In a machine for molding articles from pulp, the combination with co-operative molding dies and a transfer carrier for removing molded articles therefrom, of a pulp container, and means controlled by movement of said transfer carrier for causing delivery of a charge of pulp to said molding dies.

5. In a machine for molding articles from pulp, the combination of a fixed molding die having a reservoir and a foraminous molding face, a complemental molding die movable into said reservoir toward said foraminous molding face, and away therefrom, suction means for causing the movable die to carry the article with it when moved away from the fixed die, a transfer carrier shiftable to take articles from the displaced movable die and transfer them to a different place, a pulp container arranged to discharge pulp into said reservoir, means normally preventing such discharge, and means controlled by the movement of the transfer carrier for causing discharge of pulp from said container when the movable die is displaced from the reservoir.

6. A machine for making pulp articles comprising a stationary drier die provided with heating means and having a foraminous face portion adapted to support a wet molded article, a cooperating drier die having an imperforate polished pressing face adapted to bear on and compress the article supported by the first named die, and being also provided with heating means, power mechanism for moving the second die toward and away from the first die, liquid conducting means in communication with the peripheral part of said foraminous supporting face adapted to lead away fluid expelled from the wet article, and an outlet leading from the central part of said die.

RALPH W. CHAPMAN.